United States Patent [19]

Nahabedian et al.

[11] 4,125,748
[45] Nov. 14, 1978

[54] COMMUNICATION SYSTEM CALL TRANSFER ARRANGEMENT

[75] Inventors: Charles E. Nahabedian, Lincroft; James H. VanOrnum, Hazlet; Tse-Lin Wang, Matawan; Carl D. Weiss, Little Silver, all of N.J.

[73] Assignee: Bell Telephone Laboratories, Incorporated, Murray Hill, N.J.

[21] Appl. No.: 847,215

[22] Filed: Oct. 31, 1977

[51] Int. Cl.² .................................. H04M 3/58
[52] U.S. Cl. ...................... 179/18 BD; 179/99
[58] Field of Search .......................... 179/18 BD

[56] References Cited
U.S. PATENT DOCUMENTS

3,519,757  7/1970  Anderson .................. 179/18 J

Primary Examiner—William C. Cooper
Attorney, Agent, or Firm—David H. Tannenbaum

[57] ABSTRACT

A communication system call transfer arrangement is disclosed which relies on the establishment of two system access buttons on every telephone served by the system. The system access buttons are operational to originate a call to any station in the system over any idle link. A call on either access line can be added to any other currently active line on the telephone set. The system access buttons at all the stations operate such that an incoming intercom call will terminate on either-button, and calls can be originated from the station by using either button. For call transfer purposes the system access lines are arranged such that when the station passes a call via the access line to another station and then goes on-hook, the system access lines become idle and are available for use by the station even while the transferred call is in progress.

8 Claims, 8 Drawing Figures

FIG. 7

COMMUNICATION SYSTEM CALL TRANSFER ARRANGEMENT

FIELD OF THE INVENTION

This invention relates to communications systems and more particularly to a transfer arrangement for transferring calls to other stations.

The problem in call transfer begins when a call arrives at a station and is not intended for that station and the call must be transferred to another party. It is desirable to effect such a call transfer conveniently and without tying up the station which first answered the call. For call transferring to be done conveniently it is essential that time consuming sequences of operation are avoided to prevent errors, to eliminate complicated training routines and to eliminate the possibility of dropping a call. Also, it is important that any routine established does not require the intervention of an operator or attendant. In addition, it is highly desirable to be able to reverse the process so that calls are not transferred when a busy or nonanswering station is dialed. The reversibility of call transferring is also important in situations where the dialed station was inappropriate.

A further problem in call transfer schemes is to transfer the call in a manner that frees the transfer station to handle other connections on the same line.

PRIOR ART SOLUTIONS

In prior art systems some of these problems of call transfer are solved in various ways. For example, in typical mechanical key systems call transfer is handled by connecting the existing busy line to a new line, assuming one is available. Under such a situation the transferring station would remain active on the call and two talking buttons (two lines) would be tied up for the duration of the conference. Since the party at the transferring station may not be a necessary party to the transferred connection, such a system becomes awkward.

In some existing electronic PBX systems, the transferring station may use switch hook flashing to obtain dial tone and then dial the party to which the call is to be transferred. A conference is established upon use of a second switch hook flash and then the passing station goes on-hook to effect the transfer. Once the 3-party connection is made, the only method of removing the new called station is under control of that station and is not under the control of the passing station.

In some prior PBX nonelectronic systems, the transferring station flashes the switchhook to signal the attendant who then regains control of the call and passes it to the transferee station.

Accordingly, it is a general object of this invention to solve some of these problems in a manner to allow for efficient call transfer and without the loss of control by the transferring party.

SUMMARY OF THE INVENTION

The above discussed problems as well as other problems and objects are solved by establishing two system access intercom non-locking buttons on every electronic telephone served by a (stored program) controlled system. Each system access button is operational to originate a call to any station or other system facility (trunk, paging amplifier, etc.) over one link. A call on one link (either button) can be added to any other currently active line (on another link) at the telephone set. The system access buttons at all the stations operate such that an incoming intercom call can terminate on either button if it is idle and calls can be originated from the station using either button. For call transfer purposes, the system access lines are arranged such that when the station passes a call via the access line to another station and then goes on-hook, the system access lines become idle and are available for use by the station even while the transferred call is in progress. The system access buttons are arranged to place connections onto an idle link of the system or, by use of the conference key, onto an active link associated with another call at that station. Any system access button which is active when the station goes on-hook will be removed from the link to which it was attached and will be available for connection to any other link even though the transfer connection remains on the original link.

DESCRIPTION OF THE DRAWINGS

The foregoing features and objectives together with the operation and utilization of the present invention will be more apparent from the following description, taken in conjunction with the drawing, in which.

GENERAL DESCRIPTION — BACKGROUND

Before beginning a general discussion of the specific features claimed it may be helpful to review in general terms the operation of an overall system in which the claimed feature can be utilized. It should be borne in mind that such a feature can be used in any number of similar type systems and thus only background information on one type of system will be presented. In addition, since communication system features may be used with different types of systems each dependent on different hardware constraints and upon different programming techniques, no attempt will be made to detail the entire program used to control the overall system, as such would cloud the issue and unnecessarily lengthen this specification. Quantities mentioned were engineered for particular time and memory requirements and will not be the optimum for all such systems.

It will, of course, be obvious to one skilled in the art that in order for the feature described and claimed herein to be used with any communication system, the feature must be blended into the overall structure of the system in which it is used and must be tailored to mesh with all of the other features and operations of such a system. Thus, in order to avoid confusion and in order to allow those skilled in the art to utilize the invention claimed herein this patent specification will concentrate on providing an understanding of the problems and constraints typically found in a communication system where the feature may be used. The patent specification will provide the logical steps necessary for the implementation and blending of the described feature into such a larger system, having many such features.

This patent specification is being filed concurrently with three other patent specifications, each directed to a different operational feature of a communication system. These patent applications are Allison et al, Ser. No. 847,214, filed on Oct. 31, 1977, Fenton et al, Ser. No. 847,216, filed on Oct. 31, 1977, and Fenton et al, Ser. No. 847,217, filed on Oct. 31, 1977, and are all incorporated by reference as though they were each reproduced in their entirety herein.

TYPICAL OVERALL SYSTEM OPERATION

Figure 1:
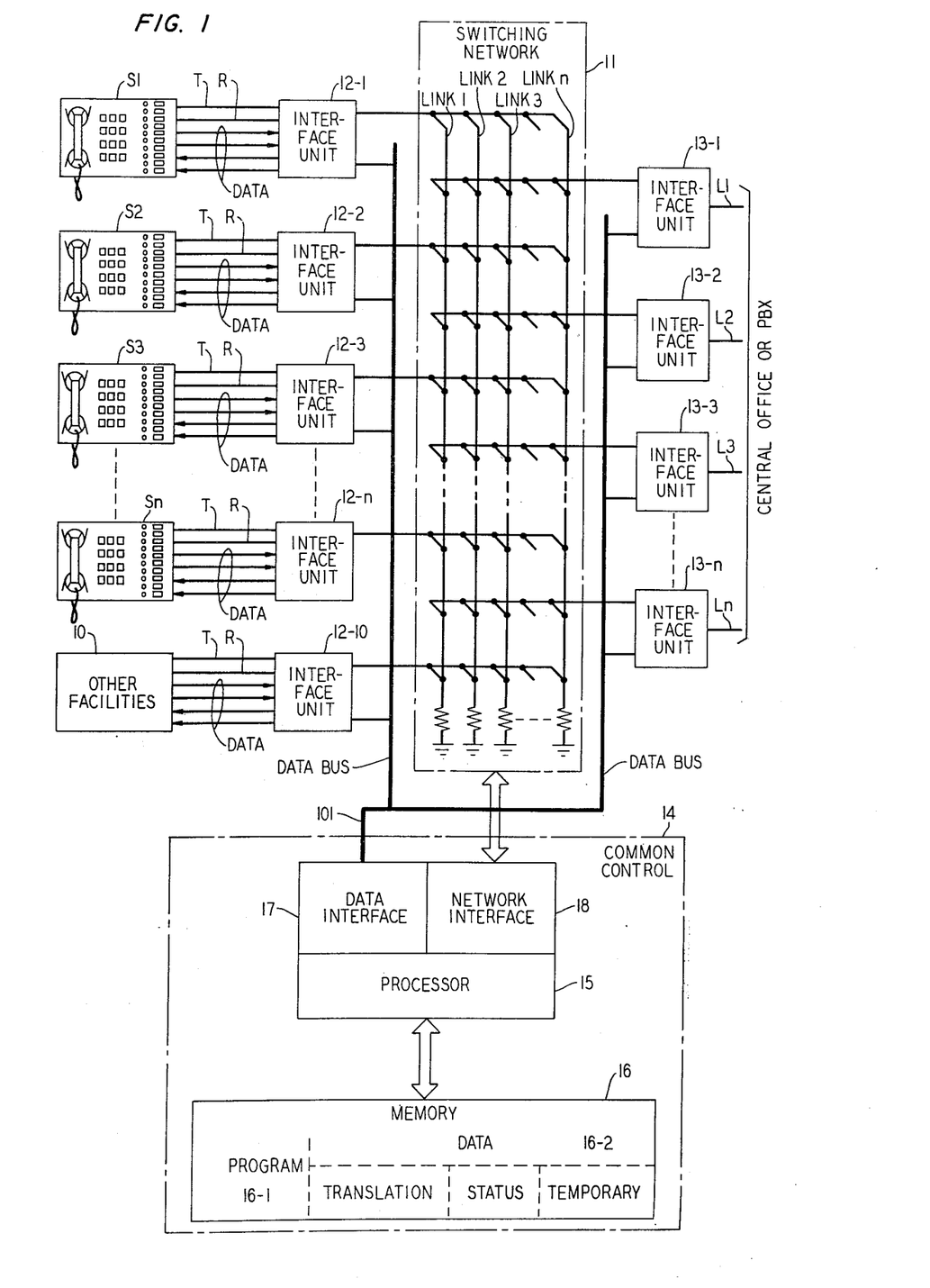
FIG. 1 shows an overall system configuration having several multibutton telephone stations (and one single-line station)

One such communication system where the structure claimed herein can be used is a station oriented, solid-state, stored program control, business communication system. FIG. 1 shows a block diagram of such a system which combines the usual key system features (hold, visual indication, etc.) with many new features not previously available.

Call processing in the system is under the control of a microprocessor 15 in common control 14. Each station such as station S1, and line port, such as 13-1, is scanned to detect any changes in status. In response to any change (e.g., on-hook, off-hook, button depression, etc.), the processor, per instructions in the stored program in memory 16 translates these changes into system commands. The system also generates commands via a bidirectional data bus to the multibutton electronic telephone (MET) set, shown in detail in FIG. 2, to light the light emitting diodes (LEDs) and ring the tone ringer associated with the MET set. All of the MET sets provide TOUCH-TONE dialing, tone ringing, and LED indications. The LED indicators will be discussed hereinafter. The tone ringer provides two distinctive audible signals — low-pitched tone ringing to indicate incoming CO calls and high-pitched tone ringing to indicate incoming station-to-station (intercom) calls. The non-button key sets are used as station positions where only station-to-station (intercom) calling and/or outward dialing, via dial access pooled facilities or the CAP, are required. In this implementation the first (lower) four buttons on each MET station set are always the same. They are: Hold, +/−, and two System Access buttons, each associated with the intercom number of the particular station. The +/− feature is described in the aforementioned copending patent application of Fenton et al (Case 4-2-3-1). The System Access buttons are used to receive calls from other stations within the communication system (intercom) and to originate such calls or to access system facilities such as lines, paging ports, etc. Incoming calls may terminate on either System Access button depending on their busy-idle status. If the lower one is busy, a second incoming call comes to the second (upper) one, giving a visual call waiting indication, accompanied by a single audible ring if the station is off-hook. The System Access buttons are also used in conferencing and call transfer features, and are described in this patent application. The remainder of the buttons on the MET station sets are flexible buttons and can be assigned to any of the button-activated station features such as call coverage.

As shown in FIG. 1 there are three pairs of wires coming out of the MET set to the interface unit: T&R, data in, data out. The T&R pairs are connected to switching network 11. In the example shown a space division network with n links is shown. It may be replaced by a time division network with n time slots. The data link between the set and the processor is used to transmit information to the processor which will configure the switching network and send LED control signals back to the telephone sets accordingly.

Common control 14 consists of processor 15, interface units 17 and 18 and memory 16. The memory unit consists of a program store 16-1, and a data store 16-2. The data store is subdivided into the following:

A. Translation which contains the hardware configuration data. For example, the button assignments and station class of service.

B. Status which stores the state of the system at a given moment. For the station, it contains
  (a) station state:
    switchhook; +/− operation; whether actively connected to the network or not,
  (b) button state:
    for each button
    (i) if I-USE is on
    (ii) what is the green status LED state
    (iii) which link is associated with calls on this button.

C. Temporary Data which is used to process a call and is a scratch-pad area.

A typical common control processor works on a 25 MS work cycle. A high level executive program, TSK-DSP, controls the order of tasks executed in a work cycle. At the beginning of each cycle, a hardware real time interrupt is received by the processor. The interrupt handling routine sets flag and returns to the interrupted task which, in turn, will relinquish control to TSK-DSP control, as soon as it reaches a convenient break point. The task dispenser decides which task is to be executed next according to a schedule. Basically, these tasks fall into three categories:

(1) Scan: Scan for physical changes (e.g., a new button depression by a station). If a change is detected and confirmed, it will be stored in a temporary buffer to be processed later.

(2) Process: After all scans are completed, changes will be processed.

(3) Maintenance: If there is time left in the 25 MS cycle, the system will perform routine maintenance functions until the next work cycle begins.

The following features can be implemented by the system discussed herein.

I-Use Indication

Figure 2:
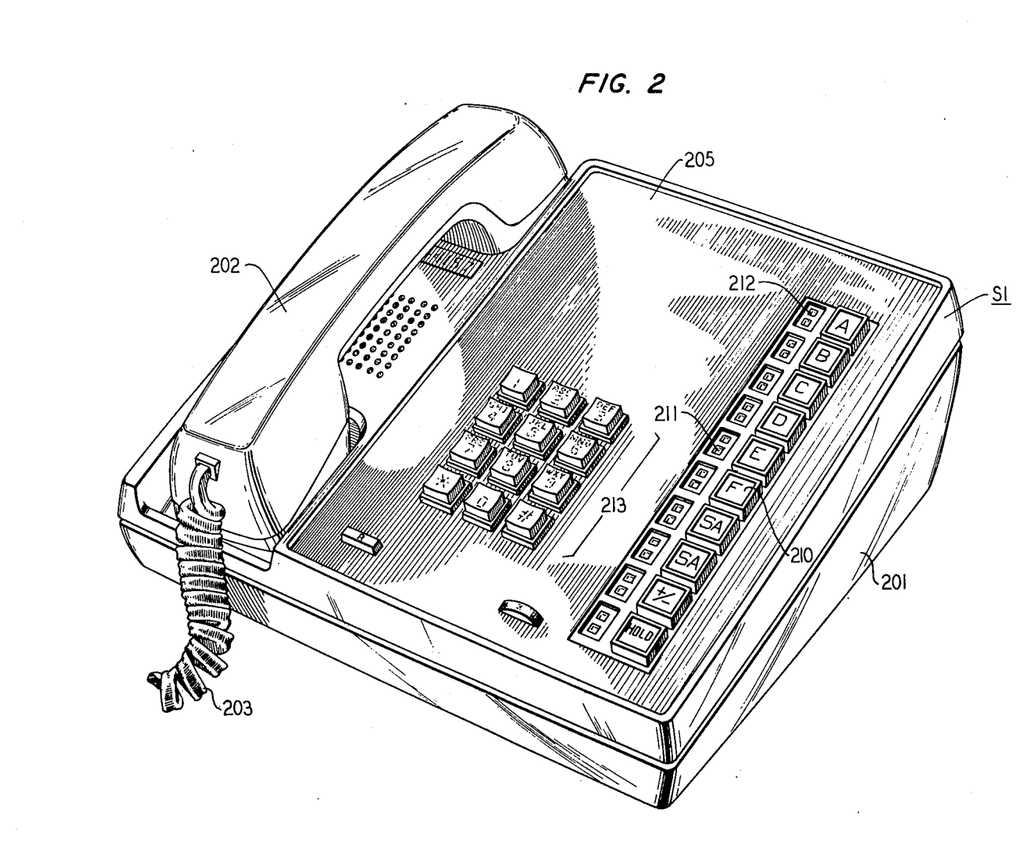
FIG. 2 shows a pictorial representation of a multibutton telephone station set.

This feature provides a red I-Use LED, such as Led 212, FIG. 2, associated with each line access button (system access, pooled facilities access, personal line access, automatic intercom, and call coverage). When off-hook, this LED indicates the line to which the station is connected. When on-hook, this LED indicates the line to which the station would be connected upon going off-hook.

Line Status Indication

Call status indications are given by means of a green status LED, such as LED 211, FIG. 2, associated with each line access button (system access, pooled facilities access, personal line access, automatic intercom, and call coverage). The status LED flashes (500 ms on, 500 ms off) during the ringing state, lights steadily during the busy state, and winks (450 ms on, 50 ms off) during the hold state.

Automatic Intercom

Automatic intercom is provided by a 2-way point-to-point voice path between two designated MET stations with automatic signaling of the called station. Upon depressing an automatic intercom button and going off-hook, the calling station user hears ringback and the called station receives the standard station-to-station distinctive alert. The status LED associated with the automatic intercom button is steady at the calling station and flashing at the called station. The called station user may answer the call by depressing the automatic intercom button and going off-hook.

Call Coverage

Call coverage is associated with a group. Each station has the option of being a sender into a given group. As a sender, that station's calls may be answered by coverage buttons associated with that group. In addition, each station has the option of being a coverage position for one or more groups — one equipped with a COVR button (or buttons) to answer calls directed from senders into the group (or groups). The status LED associated with a COVR button at each coverage station flashes whenever a station-to-station or attendant extended call is ringing at a sender station into the group. Call coverage is provided to personal line calls only if the principal station (the single station designated principal owner of that personal line) is a sender for the group. If a coverage station answers the call by depressing COVR and going off-hook, the associated status LED will indicate busy and all other COVR buttons will go idle (free to track new calls). The sender station whose call was answered will also receive a busy status indication on the line that was ringing, and it may bridge onto the call at any time by selecting that line.

If two or more eligible calls are ringing within the coverage group, the first coverage button of this group on a station will track whichever call was first to start ringing, the second coverage button of this group on the same station, if it exists, tracks the second call, et cetera. If calls directed to a station have no idle button appearance on which to terminate, busy tone will be given to the caller and this feature will not be invoked.

A station may cover for several groups by having a separate call coverage button for each group; however, a station can only send into one group. Each coverage group may have up to 8 coverage positions (i.e., 8 coverage buttons may be defined for any given group).

Ring Transfer

Ring transfer is accomplished by equipping any sender station into a Call Coverage group with a RING TRFR button to transfer audible ring to predetermined Forwarding Destination stations having coverage buttons for the associated group after a single burst of ringing. Depressing the RING TRFR button will activate this feature and light the button's status LED. Once activated, the feature will transfer ringing on any future call directed to the station. The feature is deactivated by a second push of the RING TRFR button. Except for the audible ring at the Forwarding Destinations, such calls are treated exactly as with basic Call Coverage. Any or all stations having coverage buttons for the group may be designated as Forwarding Destinations for this feature as well as Call Coverage on Busy and Call Coverage on Don't Answer.

Any sender station into a Call Coverage group may elect to have this feature. Calls directed to an idle button appearance on the sender station, while that station is busy on another line, will start ringing at predetermined Forwarding Destination stations for the associated group after a single burst of ringing at the sender station. Calls directed to the sender station and left unanswered for 1 to 15 rings (option) will transfer ringing to predetermined Forwarding Destination stations for the associated group. Except for the audible ring at the Forwarding Destinations, such calls are treated exactly as with basic Call Coverage. Any or all stations having coverage buttons for the group may be designated as Forwarding Destinations for this feature as well as Call Coverage on Don't Answer and Ring Transfer.

Plus-Minus Conference

By means of the plus/minus button, any station user may combine up to four separate calls into a single conference call — provided no more than two outside calls are involved. The conference may be established by placing and holding each individual call and then adding them together upon reaching the final party. Alternatively, idle lines may be added directly to the active call. Adding a held or idle line to an active call is achieved by depressing the plus/minus (+/−) button and then depressing the held or idle line button. All line appearances associated with an active conference have busy status and active I-use (red LED) indications. Any attempt to add a sixth station to the conference will be ignored by the system.

The station user may hold a conference (without breaking the talking path between the held parties) by depressing the HOLD button, and may reenter a held conference by depressing the line button associated with any of the held parties. The originator of a conference may selectively drop an active conferee by depressing the plus/minus button and then depressing the line button of the party to be dropped. Hanging up or selecting another line while active on a conference will terminate the station user's participation in the conference and transfer supervision to other internal stations associated within the conference. If no other internal station is available to assume supervision, the call is terminated unless there is a progress tone (ringback, busy, reorder) on the call.

The status LED associated with the plus/minus button is lighted whenever the plus/minus button is activated and is extinguished by any subsequent line button depression — including plus/minus and the switchhook.

Distinctive Alert

Distinctive alerting allows the station user to distinguish between incoming CO calls and incoming station-to-station calls. One tone is used as the alert for incoming CO calls extended by the attendant or on a personal CO line. A second higher frequency tone serves as the audible alert for station-to-station (intercom) calls. Each of these signals has a repetition period of 4 seconds with a 1-second on-time and a 3-second off-time.

Manual Exclusion

This feature allows the station user equipped with an exclusion button to exclude the answering position and others from bridging onto an existing call and also drops those stations already on the call. This feature may be cancelled manually by a second depression of the exclusion button permitting bridging, or cancelled automatically by going-on-hook. The manual exclusion status LED is lighted steadily whenever the feature is active on a nonheld call. When the call is held, exclusion remains in effect and the status LED of the exclusion button winks until the call is reentered by the holding party. This feature can be applied to only one call at a time. Stations excluded from a call hear silence and can receive no I-use indication on the excluded line. After this feature is activated, the controlling station may use the conference feature to add selected internal stations into an "excluded" outside call; however, other stations cannot add any parties to this call.

Personal Line Access

This feature provides a communications channel between a station user and a dedicated outside line via the switching network. Unlike pooled facilities, which can also be accessed by dial codes, personal lines are only accessible by means of a dedicated access button, which provides incoming as well as outgoing service.

A personal line may be shared by as many as eight stations by providing each of these stations with the associated personal line access button. Because of the conference limit, however, no more than five parties may be on any given call. Any attempt by a sixth station to bridge on will be ignored (i.e., handled as an excluded station). Full common audible ringing may be provided optionally to any or all stations sharing the line. Control of the line with respect to call coverage features is available to only one designated station.

Pooled Facilities—Button Access

Upon depressing a pooled facilities access button and going off-hook, the station user is connected to an idle line facility belonging to a common pool of outside lines (e.g., CO, FX, WATS, et cetera). The status and I-use LEDs associated with the pooled facilities access button will light steadily, and the station user will be free to complete the call. If no idle facilities are available (facilities busy indication), a user's attempt to originate will simply be denied and the I-use indication will be extinguished. A station requiring button access to several line pools may be equipped with a separate access button for each of the required pools. Each line pool may optionally be assigned a dial access code, permitting selection of an idle line from the pool by dialing the code after having originated on a system access button. Reorder tone will be returned if no lines in the selected pool are idle.

Facilities Busy Indication

This feature keeps the station user informed of the availability of any of the idle lines in any pooled facility group accessible to the station by means of a pooled facility access button. The status LED associated with a pooled facility access button will indicate busy whenever all the lines within the associated pool are busy, as well as when a line in the pool is being used at a given station.

Pooled Facilities—Dial Access

Upon selecting an idle system access button and dialing the appropriate access codes (9 or 10X), a station user will be connected to an idle line facility belonging to a common pool of outside lines (e.g., CO, FX, WATS, et cetera). The status and I-use LEDs associated with the system access button will be lighted, and the station user will be free to complete the call. If no idle facilities are available, the user's attempt to originate will be denied and reorder tone will be given. This feature is intended for nonbutton sets and MET sets not provided with an appropriate pooled facility button.

Prime Line Preference

This feature automatically connects the station user, upon going off-hook, to the line designated as the prime line. A station user may override this preference by preselecting another line or depressing the HOLD button prior to going off-hook. If ringing line preference is also in effect at a given station, that feature takes precedence.

Ringing Line Preference

For an on-hook station, this feature automatically selects a line access button which has a call ringing the station set. If two or more lines are ringing simultaneously, the station user is connected to the first line to start ringing. If the user wishes to use a different line, the line must be preselected prior to going off-hook. Once a station is off-hook, ringing line preference will be cancelled on any subsequent call until the user returns to the on-hook state. If ringing ceases while the station user is still on-hook, line preference reverts to whichever option is applicable — no line or prime line.

Station Call Transfer

By means of the plus/minus button, any station user may transfer any call to any station. Transfer may be achieved by holding the call to be transferred, placing a call to the desired station, depressing the plus/minus button, depressing the button associated with the held call, and then hanging up. Alternatively, an idle button may be plussed directly to the active line, after which the desired party may be dialed. A call transferred from one station to another and left in the ringing state for more than 120 seconds will be terminated if the transferring station is no longer active. This prevents an unmonitored transferred call from indefinitely tying up the system and the CO facilities.

Station-to-Station Calling

This feature allows a station user to directly dial other stations within the system without the assistance of the attendant. This is accomplished by selecting an idle system access button and dialing the intercom code of the desired station.

Other communication systems in which these features could be used are shown in U.S. Pat. No. 3,660,611 issued May 2, 1972 in the name of Knollman et al, and in U.S. Pat. No. 4,046,972 issued Sept. 6, 1977 in the name of Huizinga et al, which patent also shows the multibutton electronic set. The switching network and line circuits shown in FIG. 1 can be of the type shown in U.S. Pat. Nos. 3,991,279 and 3,991,280, both issued Nov. 9, 1976, and in copending application of J. J. Shanley, Ser. No. 846,162 filed on Oct. 27, 1977.

General Description — Example of Call Transfer Operation

As shown in FIG. 1, assume Station S1 is an active station wishing to transfer (or conference) a call and that station S1 has a talking path to station S2. Accordingly, station S2 will have at least one appearance of station S1 on at least one of the following buttons:

System access button (SA), line button, pooled facility button, auto-intercom button, or coverage button. Also, let us assume that station S3 is a station to which station S1 wishes to transfer station S2 or with which station S1 wishes to establish a conference between stations S1, S2 and S3, or with whom station S1 wishes to consult while station S2 is held.

Capabilities of the System

1. Station S1 can originate to station S3.

(a) This is possible because of the existence of a second system access button which is idle in almost all cases. The system can be arranged with additional system access lines for heavy traffic stations.

2. Station S1 can originate to station S3 with or without putting station S2 on hold first.

(a) If station S2 is to be put on hold, the Hold button is used and then an idle system access button is operated.

(b) If station S2 is not to be held, the plus-minus (+/−) button is operated together with an idle system access button to conference the existing call with station S2. Now station S1 (or station S2) can dial the third party station S3 and communicate in a continuous fashion. The manner in which the plus/minus button operates is discussed in co-pending application of Fenton et al (Case 4-2-3-1) Ser. No. 847,216, filed concurrently herewith.

3. After station S1 has dialed station S3, the call may reach busy or reorder tone, a don't answer condition, or a wrong number. In all these cases, station S1 can disconnect from station S3 in a uniform manner.

(a) If station S2 was held, station S1 hangs up on station S3 using the switch-hook. Station S1 can then return to station S2 or try again to reach station S3.

(b) If station S2 was already added to the originating system access line, use the +/− button to minus (or subtract) station S3. Station S2 remains connected to station S1.

4. After station S1 reaches a desired party station S3, a consultation, 3-way conference or transfer can be done by uniform actions.

(a) If station S2 was held, use +/− to add station S2 to the link on which station S3 is present. This is a 3-way conference state. To transfer, station S1 now merely hangs up. Station S3 can obviously be consulted privately by station S1 before Station S2 is added in.

(b) If station S2 has already been added to the originating system access line, there is already a 3-way conference. Station S1 hangs up to transfer.

5. During a 3-party conference state prior to completing a transfer, station S1 can decide to drop either station S2 or station S3 and continue to talk with the remaining party.

(a) Assuming stations S1, S2 and S3 are in a conference connection, there is spatial separation of Station S2 and S3 on two system access (or other) buttons, permitting station S1 to minus either stations S2 or S3 (using +/− button) selectively.

6. When in a conference connection, any party can hang up and leave the remaining parties in a two-way connection.

(a) If the party hanging up (station S2 or S3) is an outside party, then the line can be dropped from the call (by station S1) to eliminate new dial tone on the line.

(b) The remaining two parties on the call must not both be lines; otherwise, the call will be dropped automatically by the common control for lack of station supervision.

From the foregoing discussion, it can be seen that all operations which Station S1 can perform will work equally well regardless of the button-type used to communicate with station S2 or station S3. In addition, the transfer operations are extendable to any desired number of parties. Any active station is able to add new parties, or minus parties associated with one of the buttons, or hang up and "transfer" the call to those parties remaining without limiting the possible operations which are still available to the remaining parties. The only limits are those imposed by physical performance limits and the size of allocated status records and data fields.

Detailed Description

In the status memory (FIG. 1, item 1b) there is stored for each button on each station set the following information:

(a) the instantaneous state of each LED (on/off) for the two LEDs associated with the button;

(b) the long term state of each LED (flash, wink, on, off). This is called the Station Button Status (SBS) for the status LED and the Station Button Iuse (SBI) for the Iuse LED.

Also, for each station set, there is a status memory location for recording:

(c) the last detected instantaneous state of the stations's switch-hook and buttons:

(d) the desired state of the station's tone ringer (on/off, volume setting, frequency setting).

Periodically, the processor (FIG. 1, item 15) takes the information in (b) and uses it to update the instantaneous information in (a).

Periodically in the scan cycle, the processor takes the information in (a) and (d) and assembles it into a single long message for a single station in the format required by the MET station set. This data is transmitted to the MET using the data interface (FIG. 1, item 17). The MET returns to the processor, via the data interface, the instantaneous state of its switch-hook and buttons.

The returned data is compared with that in (c) above and if there are any changes, records these in a temporary buffer for that station. At a different time, another processor action called Process picks up this stimulus and causes the appropriate feature actions to be initiated in response to that stimulus.

Whenever the processor program wishes to turn on or off an LED on a MET, or set it to wink or flash, it writes the appropriate bits into the status memory described in (b) and this function will automatically occur as a consequence of the two periodic actions described above.

For each button, there is a translation record stored in the translation memory (16-2 of FIG. 1), SBID (station button identification), to identify the type of button. This information is coded in numerical form, e.g., a value of 1 identifies a personal line button, a value of 2 identifies a pooled line button, etc.

For a speech-type button (e.g., system access, autointercom, personal line, pooled line, call coverage, etc.), there are 4 possible states which will be shown to the user on the status LEDs: Namely, busy—(LED steady on), idle—(LED dark), ring—(LED flash), hold—(LED wink).

This information is stored in the status data memory (16-2 in FIG. 1) coded in numerical forms. For a non speech-type button like message-waiting, the same data format is used although the valid states may reduce to 2 (busy and idle).

As described early, the scan routines in the system detect and report a button push by the MET user to a buffered area to wait for the process routines to process.

When such a change is processed by the process routines, the button identification information, SBID, stored in 16-2 is first checked, then the button status information, SBS, stored in 16-2 is checked. The processor is thus able to interpret the button push to a specific user command and uses the proper programs stored in 16-1 to process the change. For example, button selection of (1) an idle (from SBS) speech-type (form SBID) button implies call origination requiring the associated facilities.

(2) a ringing (from SBS) speech-type (from SBID) button implies answer a ringing call.

Implementation of Call Transfer

Figure 3:
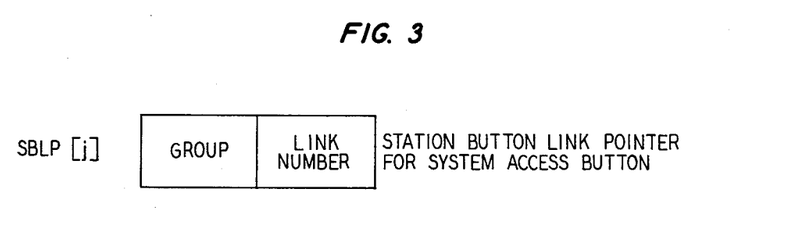
FIGS. 3 and 4 show data layouts of data stored in status memory (see FIG. 2).

Each System Access button has a status memory record shown in FIG. 3. This permits each such button to identify which network link it is associated with and which conference group it is associated with.

Figure 4:
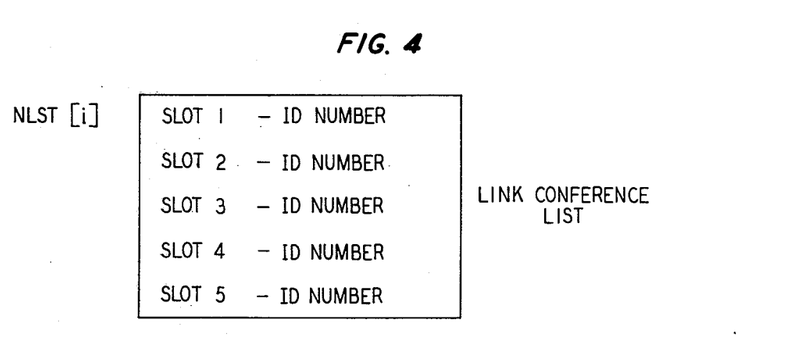

Each network link has a status memory record as shown in FIG. 4. The slot ID numbers are encoded to identify which type of facility is occupying that link slot (line station, line, originating register, tone, paging port, etc.) and which specific facility of that type is being used. Any facility is identified by an internal number which is assigned in sequence to facilities of that type.

1. A facility (station, line, etc.) can be added or removed from a link, either by actions initiated by that facility, or by actions of another facility, according to the features desired for the system. Here we describe the mechanics of this add or remove operation in terms of the basic records described above.

I. To add a facility to a link, assuming not all link slots are occupied (i.e., the conference limit is not violated): first, assign the SBLP entry for the station (or an analogous status entry for a line, tone, etc). Then, the link number may be selected as the next available link if a new link is required. Alternatively, if the facility is to be added to a link already in use, that link number is assigned. The position entry will be the first possible group (number $\phi$) if a new link is required. If a new origination is made on an existing link, the next available group number is assigned to it. Finally, if facilities on an existing link are being moved over to another link, the old group numbers are replaced by unused group numbers for the link to which the facilities are being moved. The next step is the assignment of the facility to the next available slot in the link conference list, NLST for that link. This involves only knowledge of the facility type and facility index, both of which are known when this action is performed.

II. When it is desired to remove a facility from a link, the SBLP entry or entries are cleared, and the slot entry in NLST is cleared for that facility. In addition, the position (group number) entries for facilities remaining on the link must be reassigned in some cases. This reassignment is done as follows:

(1) If the facility is not a station, or is a station which has only a single button (SBLP entry) associated with the link, then the only action affecting other facilities may occur at station(s) which have the same group number for that link. If, after the first facility is removed, the call is still viable (i.e., two or more parties, one a station), then the following analysis is performed: for the group number of the facility being removed, determine whether there is more than one station with the same group number on the link. If so, no updating of group numbers is required. If not, then delete the button(s) on the station (zero SBLP entries) which have the same group number as the facility being removed. Then the station may have no active buttons on the call and must be disconnected from the network, and its slot in the link record must be cleared.

If the call is not viable, the remaining facilities (one or more) are removed—SBLP entries cleared, and NLST entries cleared.

(2) If the facility is a station with more than one button (SBLP) associated with the link, but both buttons have the same group number, case (1) also applies:

(3) If the facility is a station with two or more buttons associated with the link but with different group numbers, then assuming that the station hangs up, the following updating is done, assuming the call is still viable. For every other station on the link (determined using NLST), find all buttons on the link having one of the group numbers of the station being removed. Replace each appearance by a single group number (either previously unused or one which has been selected from those associated with buttons on the station being removed). If the call is not viable, then other facilities are removed, as in (1).

(4) The final case occurs for a station with two or more buttons associated with a link but with different group numbers. Assume the station is to be removed from the link by a minus action taken at another station. In this case, the following analysis and actions are performed.

For each station in NLST and each button on that station associated with that link, examine the group number. If the group number matches one of those on the station being removed by minus, then remove that button appearance from that station (clear SBLP entry). When this is completed, if the station has no remaining buttons (SBLP entries) associated with that link, then remove the station from the network and link conference list (NLST). Finally, if the remaining call is not viable, remove the existing facility or facilities from the link, which then becomes idle.

How the Capabilities are Implemented

Here we examine each feature capability discussed above and, by reference to the implementation descriptions, show how the system is implemented to do these features:

1. Origination on an idle System Access button is accomplished by using the SBLP (FIG. 3) entry to verify that the button is idle and if idle is assigned to a link as described in I(1) of implementation section.

2. (a) To put station S2 on hold, only the network connection has to be broken, and the lamp state on Station S1 changed to indicate hold. SBLP (FIG. 3) and NLST (FIG. 4) are not affected.

(b) To originate using +/− to add an idle System Access button to an existing link, I(1) above applies. The facility being added to the link is an originating register, and it is assigned a link slot and an entry in a status record equivalent to SBLP, except one for a tone facility. When dialing is completed, the call progress tone and the called party will, in turn, be assigned the same link slot and group number first given to the originating register.

3. (a) Regardless of the facility to be dropped by Station S1, the feature action of going on-hook is the same. The system interprets this as described in II(1). The call becomes nonviable when Station S1 hangs up, and the remaining facility (tone, originating register, another station, line, etc.) is also removed from the link, which is then idle.

(b) If Station S1 uses the minus operation, the system interprets this as a request to remove the party or parties on the link and group identified by the SBLP (FIG. 3) entry of the minused button. Again, the required action is described in II(1), here a special case of II(4).

4. (a) To add Station S2 to the link on which Station S1 and Station S3 are connected, Station S1 uses the plus operation sequence. The system interprets this as a request to move all parties on the link identified by the SBLP (FIG. 3) entry of the button being added over to the currently active link. This is done as described in I(1).

When Station S1 wishes to transfer the call, the station hangs up. This is interpreted by the system as a request to remove Station S1 from the link identified by the SBLP entries for the buttons active at Station S1 (I-USE ON). The actions are accomplished as described in II(3).

(b) Since Station S1 is active on a link to which Stations S2 and S3 are already connected, that station may hang up, and the action is exactly as described in 4(a) above.

5. Assuming Station S1 has conferenced Station S2 and Station S3 to the same link, then the minus feature is used to remove either party. Again, the system interprets the sequence as a request to remove the party identified by the SBLP entry of the button being minused. See II(1).

6. Suppose Station S1 (or Station S3) requests a disconnect from a call. For a station, the feature action is to go on-hook. For a tone, it is to time out. This is so because a tone is allowed on a link only a prespecified maximum amount of time and every tone has a timer associated with it. For a line, the system may not detect that the outside party is hanging up. If it doesn't, the CO returns a new dial tone and a station on the link can use the minus feature sequence to drop the line. If the system does receive a disconnect request from the outside party, the case is equivalent to a tone timeout. From these cases we have:

(a) If S1 is a station which goes on hook, the system interprets this as a request to remove S1 from the link. II(1) or, in general, II(4) describes how this request is satisfied.

(b) If S1 is a timed out tone or a line which has signaled a disconnect, then the actions taken are as described in II(1). The ability of the system to detect an invalid network link state (one with no station or only one party) permits the automatic tearing down of such calls. This analysis of the link records is described in II and is performed whenever a party is removed from a link.

7. All speech-type buttons have SBLP, (FIG. 3) records associated with them. The NLST (FIG. 4) records are independent of the button type. Therefore, the implementation rules apply equally well in all cases.

Figures 5, 8:
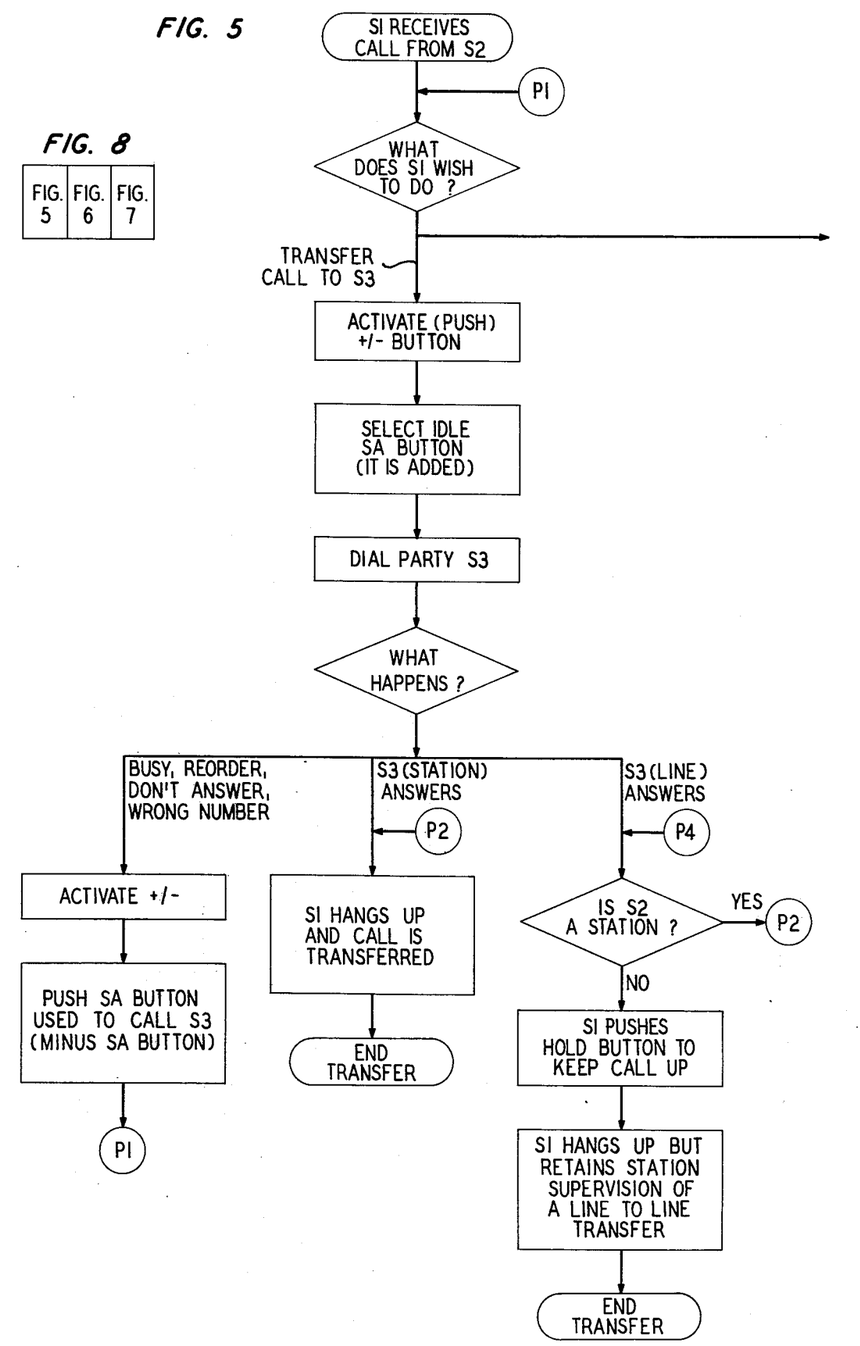
FIGS. 5, 6 and 7 show typical control steps used to control the claimed feature.
FIG. 8 shows the arrangement of FIGS. 6, 7 and 8.
Figure 6:
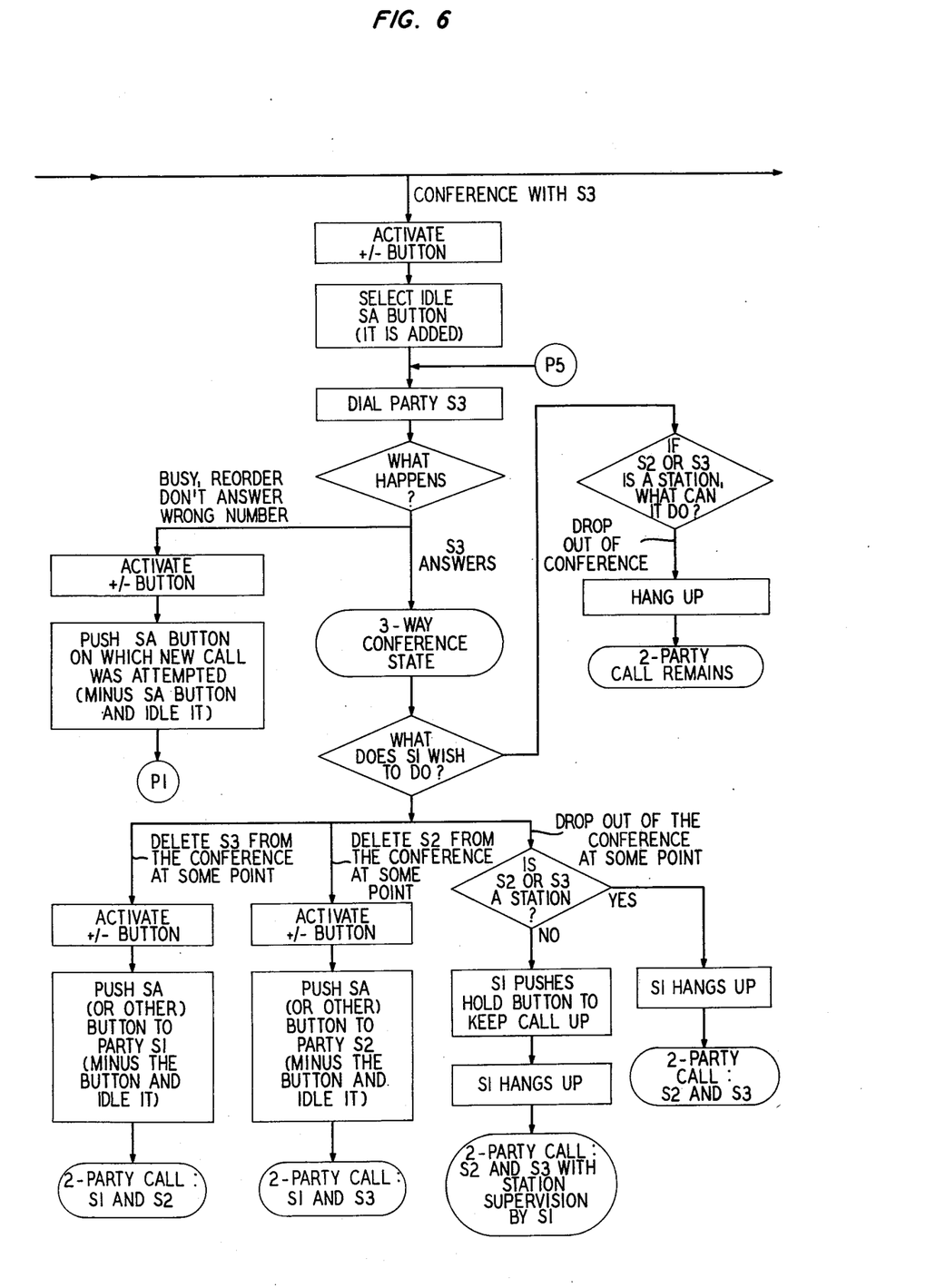
Figure 7:
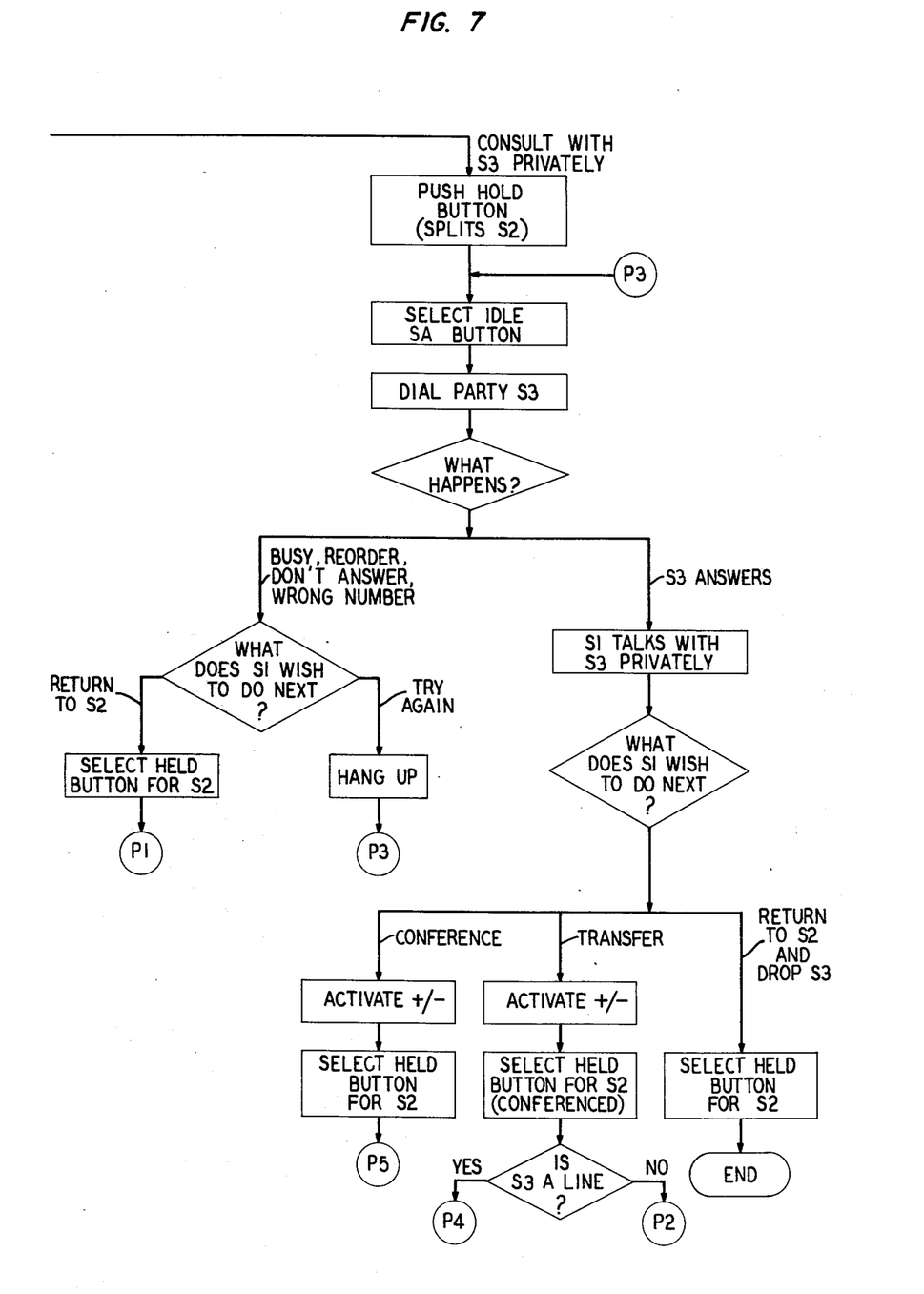

8. The system implementation has set a conference limit of five and also set various limits on number of stations and other facilities. This leads to specific status record sizes and field sizes within data words. However, examination of the implementation algorithms (or logic) described reveals that they do not depend on the number of parties on a call. There is no limiting concept of a controlling station. Adding parties to a link, or removing them, including use of the minus operation, depends only on the information in the SBLP (FIG. 3) entries and the list of conferees kept in NLST (FIG. 4). Thus, for any particular numbers chosen for conference limits, maximum number of stations, etc. a system can be implemented to handle the specified quantities, using the same algorithms of logic as discussed and as shown in FIGS. 5, 6 and 7. FIG. 8 shows the relationship of the three previous figures.

Summary of System Operation

Button designations are accomplished by use of the translation data in SBID, as explained hereinbefore. The arrangement of a button as a conference control button is disclosed in copending patent application, Fenton et al (Case 4-2-3-1), Ser. No. 847,216.

The particular buttons of type "System Access" are given standard call origination treatment on a next available idle link and the dialed digits are decoded to determine whether a station, CO line group or other system facility is required. Depending on what is being dialed, the required facilities are connected to the link.

The two System Access buttons can each be used to originate on an idle link because they have independent call records in status and translation memory. The station's talking pair network connection is related to a speech-type button such as a system access button as follows:

if the station is off-hook and both the I-USE and status LEDs are on (known from SBI and SSB)

then the talking pair is connected to the network link identified in the SBLP status record (see FIG. 3) for that station and button.

The station is also said to be active on the link and the button.

The two System Access buttons can both be associated with the same link and the I-USE and status LEDs for both will be on. This is possible by setting the link identification number in SBLP to be the same for the two buttons. The copending patent application, Fenton et al (Case 4-2-3-1), Ser. No. 847,216 on the conference feature (+/−) describes how this situation can be created. The method uses a sequence of button pushes, including the +/− button, to inform the system that a new call origination or a held call is to be added to the existing active link to which the station's talking pair is currently connected. The detailed implementation is described above.

There are two ways in which a station can become disassociated from a link:

(a) Use of HOLD. Here, the station pushes the hold button and the common control performs the following operations:

(1) turn off the I-USE LED(s) at that station;
(2) convert the status LED(s) of those same buttons to show hold;
(3) make no change to the link record NLST (FIG. 4) or the SBLP entries for the station;
(4) disconnect the station's talking pair from the link.

(1) and (2) are performed as described hereinbefore. Note that the other parties on the call are entirely unaffected and, in particular, a talking connection is maintained among them. This is a form of call transfer which reserves the ability of the station to return to the connection. Also, if the other parties are CO lines, this is the only way to accomplish a transfer and still maintain station supervision of the call.

(b) The station can go on-hook. The common control performs these operations:

(1) turn off the I-USE LED(s) of buttons associated with the link;
(2) if the buttons are of the type "System Access" turn off the status LED(s) as well;
(3) remove the station from the link, as described hereinbefore;
(4) remove the station's talking pair from the network.

Again, (1) and (2) are performed as described hereinbefore.

When a station goes on-hook to effect a call transfer, as in (b) above, the removal of the station from the link includes idling the SBLP status record for the System Access button(s) previously associated with that call. They are, therefore, idle and available for new call originations, as described above.

When a station activates Hold the talking pair for that station is disconnected from the network and all I-USE LEDs are extinguished. The station is now designated idle, and any line or System Access button can be activated for a new call origination on the next available link as described above.

The conference control button (+/−) described in the aforementioned copending patent application is a means for moving a held party or parties from one link to a second link for a 3-party (or greater) conference. When the +/− button is enabled and there is an I-USE LED ON at the station (assumed to be off-hook), then depressing the button of the held party or parties results in these actions:
(a) change the I-USE LED of the held button to ON and the status LED to ON as discussed hereinbefore;
(b) the status record SBLP for the held button is changed to contain the link number of the currently active link to which the held party is being moved and the group number is updated. The link record NLST for the active link is also updated by the addition of the new party or parties, also as described in I(1). The link record NLST for the link on which the parties were being held is cleared and the link is made idle.

Additional descriptions of the means for accomplishing the conversion to a single link are contained in the previously cited copending patent application.

If a station in a 3-party (or N-party) conference hangs up, a transfer is said to have occurred because the remaining parties are still in a talking state. This is accomplished as described above. The remaining parties are unaffected in that their talking pairs remain connected to the link.

When a station hangs up from the conference call, the System Access button, I-USE and status LEDs are cleared and the call record SBLP for that button is also cleared. Therefore, the System Access button is free to be used for a new call origination.

All System Access buttons at a station are idled as described above and both therefore can be used to originate, hold and conference new calls.

The conference control button is used for combining two calls on two different links, where one is on hold and the other link is active, meaning that the station's talking pair is connected to it. It is also used for adding a second new call origination to a currently active link so that a 3-party conference can be established which includes the party to be transferred, the party to which the transfer is to be made, and the party doing the transfer.

The manner of conferencing additional parties to a link is exactly the same as that used to add the third party. The implementation of adding parties to a link, described above, is not restricted except by a preset conference limit designed to ensure adequate network performance.

The means for disassociating a station from a link by hold or by going on hook is independent of the number of parties remaining on the link. The implementation does exactly the same operations to the station becoming disassociated, and the operations on the SBLP records for the other facilities remaining on the link are performed for each facility recorded in the link memory record NLST, regardless of their number, as described above.

The manner for adding parties to the conference is through use of the conference control button described in the aforementioned copending patent application of Fenton et al (Case 4-2-3-1).

When a station becomes disassociated from a link by hanging up, the System Access button is cleared (I-USE and status LEDs are turned off and SBLP record is cleared), and, as described above, this action does not depend on the number of parties remaining active on the link. Therefore, the System Access buttons can be used for reorigination on an idle link.

Of course, it is to be understood that the arrangements described in the foregoing are merely illustrative of the application of the principles of the present invention. Numerous and varied other arrangements may be utilized by those skilled in the art without departing from the spirit and scope of the invention.

What is claimed is:

1. A call transfer arrangement for use in a communication system having a plurality of stations each having capability of communicating with other stations over communication links internal to the system, each of said stations having a plurality of nonlocking buttons operable to establish features or communication connections to said station, said call transfer arrangement comprising a switching network having a plurality of links and a single communication pair of leads extended to each station from said switching network, said connections being under control of momentary operations of said buttons, means, including the arranging of at least two of said buttons at certain of said stations as system access buttons, each said system access button operable to enable connections to system facilities over said single pair of leads, means responsive to the operation of either of said buttons for connecting the communication leads from said station to an available one of said network links, means including the designation of one of said buttons at certain of said stations as a conference control button, said conference control button operable when said communication leads are connected to an available link for connecting a second system facility to said available link in response to a subsequent operation of the other one of said system access buttons, so that the communication leads of a first system facility become connected to said link and so that the communication leads of a second system facility also become connected to said link so that a three party conference is established between said first station and said first and second system facilities over said link, means for enabling said conference to continue between said first and second system facilities on said link when said first station becomes disassociated from said conference, and means, including the operation at said disassociated station of either of said system access buttons, for enabling a connection to an available link even while said conference between said first and said second system facilities remain enabled.

2. A call transfer arrangement for use in a communication system having a plurality of stations each having capability of communicating with other stations over communication links internal to the system, each of said stations having a plurality of nonlocking buttons operable to establish features or communication connections to said station, said call transfer arrangement comprising a switching network having a plurality of links and a single communication pair of leads extended to each station from said switching network, said connection being under control of momentary operations of said buttons, means, including the designation of at least two of said buttons at each said station as switching system access buttons, responsive to the operation of either of said access buttons for connecting the communication leads from said station to an available one of said network links, means for placing in the hold condition any communication connection established to or from said first station, means responsive to the operation of a system access button when any other communication connection from said first station to a second station is on hold on a first link for establishing a communication connection from said first station over said communication leads to a selected available second one of said links and via said selected second link to a third station, means controlled by said first station for transferring said communication connection from said first link to said second link, thereby enabling a three party conference between said first, second and third stations on said second link, and means controlled by any said first, second or third stations going on-hook for disconnecting said on-hook station from said second link while allowing said remaining off-hook stations to continue connected to said second link.

3. The invention set forth in claim 2 further comprising means responsive to a reoperation of said system access button at said first station while said second and third stations remain connected to said second link for connecting the communication leads of said first station to a next idle one of said links.

4. The invention set forth in claim 2 further comprising means operable for allowing both said system access buttons at said first station to be available to establish calling or called connections to or from said first station even while said call transfer connection on said second link continues on said link.

5. The invention set forth in claim 2 wherein one of said buttons is a conference control button, and wherein said means for transferring includes said conference enabling button.

6. The invention set forth in claim 2 further comprising means controlled by either said second or said third stations for enabling a fourth station to become connected to said conference, and means responsive to either said second or said third station going on-hook for continuing said conference connection between remaining off-hook ones of said stations.

7. The invention set forth in claim 6 further comprising a conference control button, and wherein said last-mentioned conference enable means includes means controlled by the operation of said conference control button followed by the operation of an idle one of said system facility access buttons.

8. The invention set forth in claim 6 further comprising means operable upon said second or third station becoming disassociated with said conference for allowing the system access buttons at said station to be reoperated for establishing a connection to an idle link.

* * * * *